Figure 1:
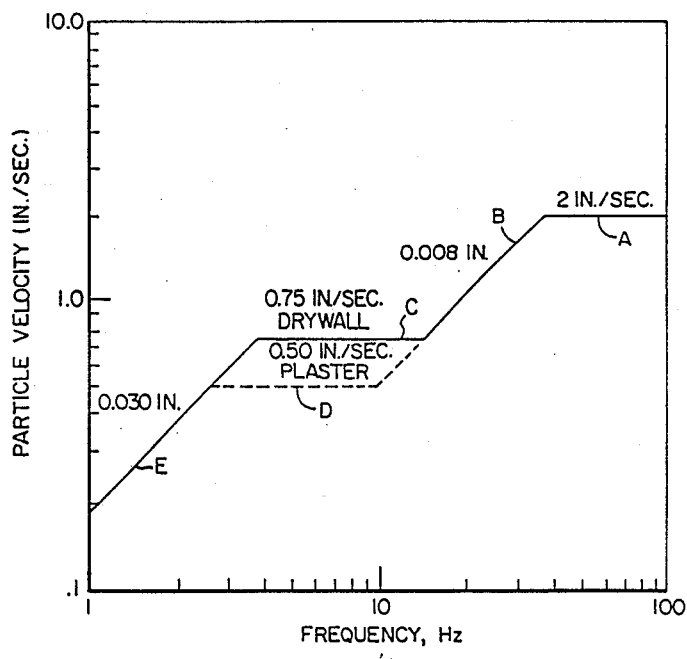

United States Patent [19]

Schmidt et al.

[11] Patent Number: 4,935,748

[45] Date of Patent: Jun. 19, 1990

[54] BLAST RECORDER AND METHOD OF DISPLAYING BLAST ENERGY

[75] Inventors: Rene Schmidt, Clayton; Gary Loubert, Kanata, both of Canada

[73] Assignee: Instantel Inc., Ontario, Canada

[21] Appl. No.: 352,053

[22] Filed: May 15, 1989

[30] Foreign Application Priority Data

May 30, 1988 [CA] Canada .................................. 569428

[51] Int. Cl.⁵ ......................... G01D 9/02; G01V 1/24; G01V 1/28
[52] U.S. Cl. .................................... 346/33 C; 367/37; 367/38; 367/43; 367/47; 367/49; 367/68; 364/223.9; 364/421
[58] Field of Search ................ 346/33 C, 1.1; 367/37, 367/38, 43, 47, 49, 68; 364/223.9, 421, 724.01, 724.06, 724.08, 733

[56] References Cited

U.S. PATENT DOCUMENTS 4,571,710  2/1986  Neidell .................................. 367/38

Primary Examiner—Bruce A. Reynolds
Assistant Examiner—Scott A. Rogers
Attorney, Agent, or Firm—Antonelli, Terry, Stout & Kraus

[57] ABSTRACT

A blast recorder and method for monitoring and processing vibrations from blasts, and for displaying the results in a nearly real time basis and in a manner which is easily interpreted by a relatively unskilled field worker and corresponds to a form which closely correspond to the real damage causing aspect of the blast than heretofore. The invention operates by receiving seismic energy signals from a blast sensor, processing the energy signals to obtain velocity signals relating to said blast, filtering either the energy signals prior to, or the velocity signals following said processing step, into high and low frequency bands, to obtain high and low band velocity signals, integrating over the period of the blast the high and low band velocity signals to obtain high and low band displacement signals, determining the peak velocity signal in each band, over the period of the blast, and displaying one or all of the peak of the velocity signal determined in the high frequency band, the peak of the velocity signal determined in the low frequency band, and the displacement signal related to the low frequency band.

22 Claims, 2 Drawing Sheets

BLAST RECORDER AND METHOD OF DISPLAYING BLAST ENERGY

This invention is related to blast recorders, and particularly to a blast recorder useful for monitoring the vibrations from blasts used in construction, to ensure that they meet the requirements of the law, the owners of adjacent buildings, the user of the recorder, and of the environment.

When blasting rock, e.g. for construction, it is important to ensure that vibrations imparted from the blast through the earth to adjacent buildings are below predetermined levels, and can be proven so by a recording.

It had been believed that structure resonances are important to be considered when determining the maximum safe energy sustainable by a residential structure being subjected to environmental blasts. However in recent years it was determined that at other frequencies it is the peak displacement of particles with respect to particle velocity that is the safety determining factor. The U.S. Bureau of Mines, in report RI-8507 (November 1980) specified the safety limits for residential buildings subjected to blast vibrations. In these criteria, above 40 Hz a constant peak particle velocity of 2.0 in/sec. is indicated to be the maximum safe value. Below 40 Hz, the maximum safe particle velocity decreases at a rate equivalent to a constant peak displacement of 0.008 in. At frequencies corresponding to about 4 to 15 Hz, constant particle velocities of 0.75 in/sec. for drywall and 0.50 in/sec. for plaster, are again a determining safety factor Below 4 Hz, a maximum particle displacement of 0.03 in. is recommended.

To determine the vibration sustainable by a building, seismic sensors have been used, typically located in three mutually orthogonal axes. Previous systems perform Fourier transforms of the sensed vibrations from the sensors to obtain a spectrum analysis of the sensed vibrations. Because Fourier analyses are performed, which takes many digital computing hours, the recorded data signals were recorded and transported to a laboratory for analysis.

Clearly if damaging blasts were created, the blasting personnel would have no knowledge of this until many hours or a day or more following the blasts, due to the required computing time. By this time the blasts could have produced great damage in adjacent structures. The alternative would be to wait until each blast had been analyzed. This would take excessive amounts of time, and would not allow the blasting to be completed within a reasonable interval, slowing the work and substantially increasing the costs.

While a spectrum analysis is provided as a result of the Fourier analysis, the data can vary depending on the frequency channel widths in which the data are gathered. Thus different equipment, having different channel widths or different center frequencies, or with slight differences in adjustment, would produce different results. Accordingly there could be no legally reliable measurement results, and the results are clearly subject to abuse.

In addition, the prior art systems, while producing a Fourier analysis, did not provide a result relating to the particle displacement. Thus it was impossible to know whether the aforenoted 0.008 particle displacement below 40 Hz or 0.030 in. below 4 Hz was met.

Clearly prior art systems for attempting to determine and record seismic energy transmission from a blast were neither practical nor accurate in the field.

The present invention is a blast recorder which determines on a virtually real time basis whether the recommendations of both maximum particle velocity and displacement are met. Further, the invention apparatus can be produced so light and portable that it can be used in the field. Thus the characteristics of the seismic energy can be determined and recorded as proof of the blast, immediately following a blast. If the blast energy exeeds the recommended values of particle velocity and particle displacement, corrective action can be taken immediately, thereby avoiding additive damage to nearby buildings.

In accordance with a preferred embodiment, the blast recorder is comprised of apparatus for sensing seismic vibrations of a blast, and for providing a velocity signal corresponding to the particle velocity relating to the vibrations. The apparatus for sensing seismic vibrations are preferably sensors. However the sensors can be accelerometers followed by integrators, or displacement sensors followed by differentiators, for outputting a velocity signal corresponding to the particle velocity relating to the vibrations. Filters filter each velocity signal into a high and a low frequency band. The velocity signal of each band is then integrated in integrators to determined high and low band displacement signals. The maximum velocity signal in each band is determined, and one or all of the maximum velocity signal determined in the high frequency band, the displacement signal related to the high frequency band, the maximum velocity signal determined in the low frequency band, and the displacement signal related to the low frequency band, are displayed. Preferably the last-noted signals are displayed graphically by printing on a callibrated graph on a printer, but can alternatively or additionally be displayed on a graphical display (e.g. liquid crystal) and numerically either on the instrument display or printer. The signals can also be stored in a local memory for more detailed later analyses. Preferably the graphical display is in exactly the form given by the U.S. Bureau of Mines, and is displayed on the same display as the recommended values. In the case that the sensors are accelerometers followed by integrators or displacement sensors followed by differentiators, the filtering can be effected either prior or following integration or differentiation. Further all or some of the signal processing can be done in a microprocessor. If desired, the output signals of the sensors can be recorded for later processing or analysis.

Figure 2:
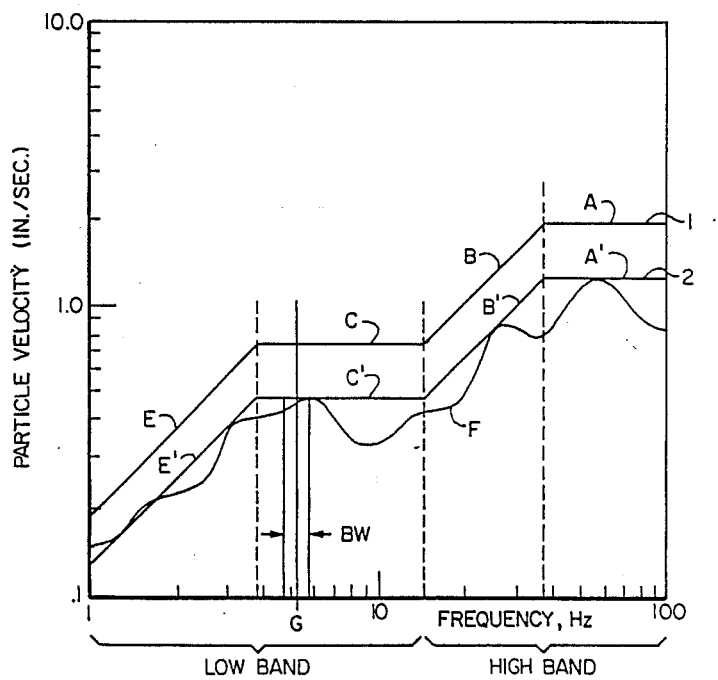
Figure 3:
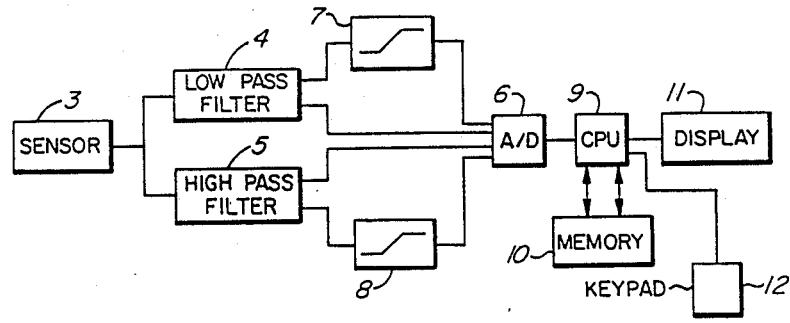

A better understanding of the invention will be obtained by reference to the detailed description below, with reference to the following drawings, in which:

FIG. 1 is a graph representing the maximum safe particle velocities and particle displacements are various frequencies from 1 to 100 Hz, FIG. 2 is a reproduction of FIG. 1, on which are plotted various curves showing the results of prior art and the present system, FIG. 3 is a block schematic of the preferred embodiment of the present invention, and FIGS. 4–7 are block schematics of other embodiments of the invention.

Turning to FIG. 1, a graph of maximum safe particle velocity against frequency is shown. The graph shows that the maximum safe peak particle velocity above 40 Hz is 2.0 in/sec., shown by curve portion A. Below 40

Hz the maximum safe velocity decreases at a rate equivalent to a constant peak displacement of 0.008 in., shown by graph portion B. Below 15 Hz, the maximum recommended peak particle velocity is 0.75 in/sec. for drywall (curve C), and 0.50 in/sec. for plaster (shown as curve portion D). Below about 4 Hz the particle displacement above 0.030 in. is considered to be dangerous, this curve portion being designated as E. The graph is specific in form, but the safe maxima and slopes are variable, depending on the building structure and location, and thus on its sensitivity.

FIG. 2 is a reproduction of the aforenoted curve. However in this case a curve F has been superimposed, representing the actual particle velocity with frequency occurring as a result of a blast.

As noted earlier, prior art systems perform a spectrum analysis of the particle velocities across the entire frequency spectrum. In performing such analyses, integrations of the particle velocities within successive defined very narrow frequency bands centered at e.g. frequency G, and having bandwidths BW are performed, after recording the seismic signal from each sensor. Within each BW segment, the energy is totalled, and a plot or listing of the values is made, in an attempt to reproduce curve F.

As noted earlier, such a procedure takes hours and also involves the use of a large capacity computer. Furthermore, this system does not provide any indication of the displacement, as a requirement in curve graph sections B and E (FIG. 1), and thus omits a significant determination of whether the safety limits have been exceeded.

In addition, the interpretation of a curve such as a curve F, and how it relates to a curve such as that shown in FIG. 1 cannot be done by relatively unskilled field personnel, especially since parts of curve F bear no relationship to the units of curve portions B and E.

In the present invention an output display can be created which corresponds both to the form and to the units of the safe criteria maxima prescribed by the U.S. Bureau of Mines. The output display of the present invention is shown in FIG. 2, which shows the results of the blast in representative curve sections A, corresponding to curve portion A, B' corresponding to curve portion B, C' corresponding to curve portion C or D, and curve portion E' corresponding to curve portion E.

The above result is obtained in the present invention by filtering the sensor output signal as it is received, splitting it into a high band signal preferably above about 15 Hz, and a low band signal, below about 15 Hz.

In the preferred embodiment, received velocity sensor output signals in the high band and low frequency bands are integrated, resulting in displacement signals. The peak velocity signal in each of the respective bands is printed, displayed or plotted as curve portions A' and C' respectively, and are merely horizontal lines at the peaks conforming to the form of curve portions A and C. The displacement signals for the high and low frquency bands are printed, displayed or plotted as curve portions B' and E'.

The curve portions A', B', C' and E' are preferably presented on a CRT or LED display with a curve representing the allowable maxima, that is curve portions A, B, C and/or D and E. Thus for a particular blast the curve 1, representing the allowable maxima, and curve 2, representing the results of a particular blast, are displayed together. An unskilled worker can thus immediately determine whether a particular blast exceeds the allowable maxima of either or both particle velocity or particle displacement. Further, since the determination is made in real time, there is no delay involved in adjusting the blast parameters, as was required in the prior art.

FIG. 3 illustrates the preferred embodiment of the present invention. A representative seismic sensor 3 provides an output velocity signal to low and high pass filters 4 and 5. Preferably three separate sensors in three mutually orthogonal axes are used for sensing seismic energy in three mutually orthogonal directions. Preferably the output signal of each sensor is treated separately, but the vector sum of all three sensors could be used in certain cases. The resulting output signal of each sensor is applied to low and high pass filters 4 and 5. The low pass filter passes all input signals below about 15 Hz, while the high pass filter passes signals above about 15 Hz. However the particular bands used can be different from the above to suit the circumstances.

The output signals of low and high pass filters 4 and 5 are applied to analog to digital converter 6. The output signal of low pass filter 4 is also applied to integrator 7, and the output signal of high pass filter 5 is applied to integrator 8. The output signals of integrators 7 and 8, representing displacements, are applied to the analog to digital converter 6, along with the output signals of low and high pass filters 4 and 5 which represent the velocity.

Analog to digital converter 6 converts the four singals input to it into a digital form for application to a central processing unit 9 to which is connected a memory 10, a display 11, and a keypad 12. The display is representative of one or more of several forms of displays, such as an LCD graphical display, which may or may not include an alphanumeric display of the values displayed, and/or a printer, for providing hard copy of the displayed data.

Memory 10 is used by the CPU 9 to store operation programs, and also to store the data to be displayed, in a well known manner.

The channels each comprised of the low pass filter, integrator and connection from the low pass filter to A/D converter 6 are preferably reproduced for each mutually orthogonal seismic sensor, and the vector sum of the signals from the A/D converter determined by the CPU 9. Alternatively the sensor 3 outputs a vector sum of the energy received and provides a signal into the circuit shown.

It should also be noted that the vector summation, low pass filtering and integration can be performed by the CPU itself. In that case FIG. 3 should be considered as a representative block diagram illustrating the algorithm to be performed in obtaining the signal forms required by the CPU in order to form the display of the graph 2 shown in FIG. 2, except that analog to digital conversion can be performed with the output signals of the sensors, prior to filtering, rather than following, as shown. The signals representative of the constants in the various portions of graph 1 also to be displayed in display 11 can be prestored in memory 10 by entering them by means of keypad 12 connected to CPU 9.

Thus in operation the entire apparatus, preferably packaged in a suitcase sized instrument is taken to the field, and the sensor unit comprised of seismic sensors in three mutually orthogonal axes is placed where it can sense the ground vibrations. The blast is set off. The resulting signal from each sensor 3 is applied to corresponding low and high pass filters 4 and 5, and split into high and low frequency bands. The output signals of low and high pass filters 4 and 5 are applied to A/D converter 6, and are also applied to integrators 7 and 8. The integrated output signals of integrators 7 and 8 are also applied to A/D converter 6. The digitized resulting output signals are applied to CPU 9.

In CPU 9 in conjunction with memory 10, the digitally converted signals are vector summed, and a determination is made of the peak energy during the blast interval in the high frequency band, e.g. above 15 Hz, and the peak energy in the low frequency band, e.g. below 15 Hz. These peak energies are displayed or plotted as horizontal lines A' and C' respectively.

The energies in each of the high and low bands is summed, and integrated, to obtain peak displacements in the low and high frequency bands during the blast, which are plotted as the sloped lines E' and B' respectively on the same display, the slope of the lines E and B being the integrals of the energy in each of the bands. Where the lines B' and C' intersect, they are terminated, and where the lines E' and C', and B' and A' intersect, they are terminated, to form a continuous plot.

As noted earlier, the values representing the line segments representing the particle velocity and displacement danger maxima are prestored in memory. These are displayed on display 11 as line segments A, B, C and E at the same time as line segments A', B', C' and E'.

The result is an easy to read display which corresponds substantially to the curve form representing the particle velocity and displacement values recommended by the U.S. Bureau of Mines, and are readily understandable by an unskilled worker in the field.

In addition, the display is made available immediately after the blast, avoiding the requirement for laboratory analyses of the seismic data to determine whether the blast criteria have been exceeded. Yet if desired, the sensor output signals can be recorded, and carried to a laboratory for later analysis if desired, whereupon the recorded signals are input into the apparatus as sensor signals.

Figure 4:
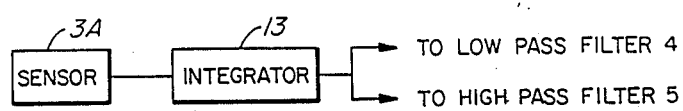

In accordance with other embodiments, as shown in FIG. 4, the sensor 3A is an accelerometer 13, feeding an acceleration signal into an integrator, which outputs a velocity signal to low and high pass filters 4 and 5 as in FIG. 3. The remainder of this embodiment is as in FIG. 3.

Figure 5:
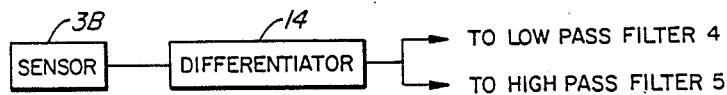

As shown in FIG. 5, the sensor is a displacement sensor, feeding a displacement signal into a differentiator, which outputs a velocity signal to low and high pass filters 4 and 5 as in FIG. 3. The remainder of this embodiment is as in FIG. 3.

Figure 6:
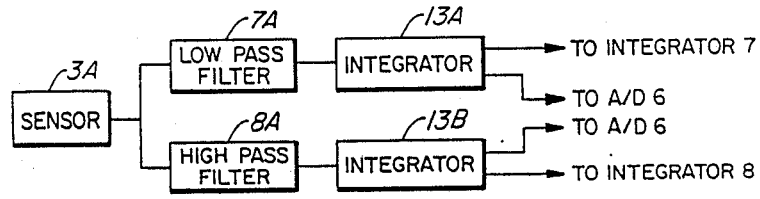

As shown in FIG. 6, the sensor is an accelerometer, feeding an acceleration signal into low and high pass filters 7A and 8A, which band limit the signal into bands such that after integration in integrators 13A and 13B it corresponds to the velocity signal bands output from filters 7 and 8. The signals from the integrators 13A and 13B are fed to integrators 7 and 8 and A/D 6 as in FIG. 3, to which the remainder of this embodiment corresponds.

Figure 7:
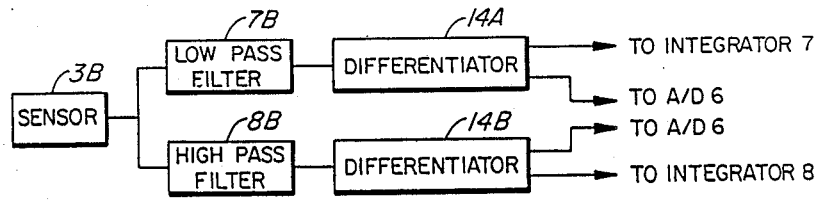

As shown in FIG. 7, the sensor is a displacement sensor, feeding a displacement signal into low and high pass filters 7B and 8B, which band limit the signal into the bands such that after differentiation in differentiators 14A and 14B, it corresponds to the velocity signal bands output from filters 7 and 8. The signals from differentiators 14A and 14B are fed to integrators 7 and 8 and A/D 6 as in FIG. 3, to which the remainder of this embodiment corresponds.

It should also be noted that any of these embodiments can be implemented as an algorithm in a computer, processing the signals received from the various sensors, as described above.

The result is a a relatively inexpensive, portable instrument which is highly useful for practitioners in the blasting field, and, it is believed, represents a significant advance in the art.

A person understanding this invention may now conceive of various alternative structures or variations thereof, using the principle described herein. All are considered to be within the sphere and scope of the invention as defined in the claims appended hereto.

We claim:

1. A blast recorder comprising:
    (a) means for sensing seismic vibrations of a blast, and for providing a velocity signal corresponding to the particle velocity related to said vibrations,
    (b) means for filtering the velocity signal into high and a low frequency bands,
    (c) means for integrating over the period of a blast the velocity signal of each band to obtain high and low band displacement signals,
    (d) means for determining the peak of the velocity signal in each band, over the period of the blast, and
    (e) means for displaying one or all of the peak of the velocity signal determined in the high frequency band, the displacement signal related to the high frequency band, the peak of the velocity signal determined in the low frequency band, and the displacement signal related to the low frequency band.

2. A blast recorder as defined in claim 1 in which said means for displaying includes a printer for graphically printing the peak of the velocity signal determined in the high frequency band above a first intermediate frequency in the high frequency band, the displacement signal related to the high frequency band below the first intermediate frequency, the peak of the velocity signal in the low frequency band determined in the low frequency band above a second intermediate frequency in the low frequency band, and the displacement signal related to the low frequency band, as a continuous line.

3. A blast recorder comprising:
    (a) means for sensing seismic vibrations of a blast, and for providing a velocity signal corresponding to the particle velocity related to said vibrations,
    (b) means for integrating the velocity signal to obtain a displacement signal,
    (c) means for determining the peak of the velocity signal over the period of the blast, and
    (d) means for displaying the peak of the velocity signal and the displacement signal as representatives of the peak particle characteristics of the blast.

4. A method of displaying seismic blast signals comprising:
    (a) receiving a seismic particle velocity signal resulting from a blast,
    (b) integrating the particle velocity signal over the period of the blast to obtain a particle displacement signal,
    (c) determining the peak of the velocity signal,
    (d) displaying the peak velocity signal and the particle displacement signal as the blast criteria maxima.

5. A method as defined in claim 4 including the step of splitting the seismic signal into low and high band components prior to the integrating step, and separately integrating the low and high band components, determining the peaks of the high and low band components of the velocity signal, and displaying said peaks and the integrated high and low band components as peak particle velocity and particle displacement values within the respective high and low frequency bands.

6. A method as defined in claim 5 including the step of displaying the high and low band component peak particle velocities as horizontal lines and the particle displacement values as sloped lines on a graphical display, as a continuous line.

7. A method as defined in claim 6 including the step of also displaying the peak safe recommended particle velocities as horizontal lines and peak safe recommended particle displacement as sloped lines, as a continuous line, on said display.

8. A method as defined in claim 6 in which the display is a printer.

9. A method as defined in claim 4 including the step of vector summing the seismic signal from several seismic sensors to obtain said seismic particle velocity signal.

10. A method of displaying seismic blast signals comprising:
(a) receiving seismic energy signals from a blast sensor,
(b) processing the energy signals to obtain velocity signals relating to said blast,
(c) filtering either the energy signals prior to, or the velocity signals following said processing step, into high and low frequency bands, to obtain high and low band velocity signals,
(d) integrating over the period of the blast the high and low band velocity signals to obtain high and low band displacement signals,
(e) determining the peak velocity signal in each band, over the period of the blast, and
(f) displaying one or all of the peak of the velocity signal determined in the high frequency band, the peak of the velocity signal determined in the low frequency band, and the displacement signal related to the low frequency band.

11. A method as defined in claim 10 in which the seismic energy signals are comprised of acceleration signals, and the processing step is comprised of integration.

12. A method as defined in claim 10 in which the seismic energy signals are comprised of displacement signals, and the processing step is comprised of differentiation.

13. A method as defined in claim 10 in which the signals are received directly from a seismic sensor during the period of a blast.

14. A method as defined in claim 10 in which the signals are received from a recording of seismic energy signals recorded some time previously.

15. A method as defined in claim 7 in which the display is a printer.

16. A method as defined in claim 8 in which the display is a printer.

17. A method as defined in claim 5 including the step of vector summing the seismic signal from several seismic sensors to obtain said seismic particle velocity signal.

18. A method as defined in claim 6 including the step of vector summing the seismic signal from several seismic sensors to obtain said seismic particle velocity signal.

19. A method as defined in claim 11 in which the signals are received directly from a seismic sensor during the period of a blast.

20. A method as defined in claim 12 in which the signals are received directly from a seismic sensor during the period of a blast.

21. A method as defined in claim 11 in which the signals are received from a recording of seismic energy signals recorded some time previously.

22. A method as defined in claim 12 in which the signals are received from a recording of seismic energy signals recorded some time previously.

* * * * *